United States Patent
Mukherjee et al.

(10) Patent No.: US 12,507,091 B2
(45) Date of Patent: *Dec. 23, 2025

(54) TESTING IN 5G SA COMMUNICATION NETWORK

(71) Applicant: Rakuten Symphony, Inc., Tokyo (JP)

(72) Inventors: Argha Mukherjee, Bangalore (IN); Roshan Kumar, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 542 days.

This patent is subject to a terminal disclaimer.

(21) Appl. No.: 18/016,929

(22) PCT Filed: Dec. 27, 2022

(86) PCT No.: PCT/US2022/082395
§ 371 (c)(1),
(2) Date: Jan. 19, 2023

(87) PCT Pub. No.: WO2024/107234
PCT Pub. Date: May 23, 2024

(65) Prior Publication Data
US 2024/0251263 A1 Jul. 25, 2024

(30) Foreign Application Priority Data
Nov. 14, 2022 (IN) .............................. 202241065072

(51) Int. Cl.
*H04W 24/06* (2009.01)
(52) U.S. Cl.
CPC .................................. *H04W 24/06* (2013.01)
(58) Field of Classification Search
None
See application file for complete search history.

(56) References Cited

U.S. PATENT DOCUMENTS

| | | | | |
|---|---|---|---|---|
| 7,385,936 B2* | 6/2008 | Shipman | .............. | H04Q 3/0083 370/254 |
| 7,505,153 B2* | 3/2009 | Vuong | .................... | G03F 7/705 250/559.22 |

(Continued)

OTHER PUBLICATIONS

Hsiao, "Employing a Wireless Sensing Network for AIoT Based on a 5G Approach," Electronics 11.5 (2002): 827, Mar. 7, 2022, retrieved on Feb. 24, 2023 from <http://www.mdpi.com/2079-9292/11/5/827>.

(Continued)

*Primary Examiner* — Wutchung Chu
*Assistant Examiner* — Berhanu D Belete
(74) *Attorney, Agent, or Firm* — Sughrue Mion, PLLC

(57) ABSTRACT

Embodiments are directed to a new radio distributed unit (NRDU) simulation server for testing in 5G standalone (SA) communication network. The NRDU simulation server includes a memory, a processor, a communicator. The processor includes a test controller connected to the plurality of simulated UEs configured to receive at least one testing profile associated with a DUT and a multi user equipment (UE) simulator (MUCE) configured to dynamically generate a plurality of simulated UEs based on the at least one testing profile. The processor also includes a DU simulator configured to generate a plurality of simulated DUs based on the at least one testing profile; an IP security Manager (IPSEC MGR) configured to simulate internet protocol (IPSEC) functionality between at least one DU and the DUT; and a first traffic generator and a second traffic generator configured to generate a traffic profile based on the at least one testing profile.

18 Claims, 5 Drawing Sheets

(56) References Cited

U.S. PATENT DOCUMENTS

| | | | | |
|---|---|---|---|---|
| 10,031,050 | B2* | 7/2018 | Fattu | H01R 43/20 |
| 11,216,563 | B1* | 1/2022 | Veselov | H04L 63/1408 |
| 11,265,347 | B2* | 3/2022 | Hastings | H04L 63/0263 |
| 12,034,626 | B2* | 7/2024 | Stan | H04L 43/50 |
| 2003/0012141 | A1* | 1/2003 | Gerrevink | H04L 43/50 370/392 |
| 2003/0181210 | A1* | 9/2003 | Shipman | H04Q 3/0083 455/446 |
| 2006/0206615 | A1* | 9/2006 | Zheng | H04L 63/0227 709/229 |
| 2007/0234247 | A1 | 10/2007 | Pritchard et al. | |
| 2008/0106728 | A1* | 5/2008 | Vuong | G01N 21/4788 356/73 |
| 2008/0106729 | A1* | 5/2008 | Vuong | G01N 21/95607 356/73 |
| 2014/0233413 | A1 | 8/2014 | Dahod et al. | |
| 2015/0032437 | A1* | 1/2015 | Kumar | G06F 30/3308 703/14 |
| 2015/0051872 | A1* | 2/2015 | Arora | G06F 11/3428 702/186 |
| 2016/0366604 | A1* | 12/2016 | Devarasetty | H04L 5/0053 |
| 2017/0013121 | A1* | 1/2017 | Baeder | H04M 3/00 |
| 2018/0106702 | A1* | 4/2018 | Fattu | H01R 43/20 |
| 2019/0089740 | A1* | 3/2019 | Hastings | H04L 41/0895 |
| 2021/0377902 | A1* | 12/2021 | Merkel | H04W 64/003 |
| 2022/0295307 | A1* | 9/2022 | Arshad | H04W 76/15 |
| 2023/0362689 | A1* | 11/2023 | Cauduro Dias de Paiva | H04W 52/24 |
| 2024/0129219 | A1* | 4/2024 | Stan | H04L 43/0894 |
| 2024/0314058 | A1* | 9/2024 | Mueck | H04L 41/40 |
| 2025/0180633 | A1* | 6/2025 | Chejanovsky | G01R 31/2877 |
| 2025/0180638 | A1* | 6/2025 | Chejanovsky | G01R 31/2874 |

OTHER PUBLICATIONS

International Search Report and Written Opinion for International Patent Application No. PCT/US2022/082395 mailed Mar. 16, 2023.

Oliver, "Japan's Rakuten Mobile partners with Spirent for 5G core network testing," 5Gradar, Jun. 5, 2020, retrieved on Feb. 24, 2023 from <https://www.5gradar.com/news/japans-rakuten-mobile-partners-with-spirent-for-5g-core-network-testing>.

Senk et al., "5G NSA and SA campus network testbeds for evaluating industrial automation," European Wireless 2021, 26th European Wireless Conference, VDE, 2021, retrieved on Feb. 24, 2023 from <http://ieeexplore.ieee.org/abstract/document/9657093>.

* cited by examiner

TESTING IN 5G SA COMMUNICATION NETWORK

CROSS-REFERENCE TO RELATED APPLICATIONS

The present application claims priority to and is the 35 U.S.C. § 371 United States National Phase application based on International Patent Application No. PCT/US22/82395, filed Dec. 27, 2022, and entitled "Testing in 5G SA Communication Network," which claims priority to Indian Patent Application number 202241065072 to Argha Mukherjee et al., filed Nov. 14, 2022, and entitled "Testing in 5G SA Communication Network", and incorporates their disclosures herein by reference in their entireties.

FIELD OF INVENTION

The present disclosure relates to device testing and simulation and more specifically related to a method and a new radio distributed unit (NRDU) simulation server for testing in 5G standalone (SA) communication network.

BACKGROUND

With advancement in technology, a number of users connected to a wireless communication network have increased drastically over time. Therefore, it is important to provide reliable and efficient operation of network functional elements to ensure high quality of service (QOS) to the users. In order to ensure the efficiency of the network functional elements network operators typically test the network functional elements using testing devices before deploying in a live wireless communication network.

The testing devices simulate various communication network conditions while testing the network functional elements which may include for example but not limited to, simulating a number of user equipment or UEs capable of simultaneously registering/de-registering with the wireless communication network, simulating inter-/intra-mobile network equipment handover, transmitting bearer traffic, and/or combinations thereof. The testing of the network functional elements may be one of the three categories which includes functional correctness testing (e.g., protocol validation and compliance), inter-system compatibility and integration testing, and stress testing.

Currently there are no stable simulator products that can test 5G CU capacity at pre-deployment stage with all different near to filed scenarios. The existing methods do not resolve real DU/RU/UE dependency to test a 5G CU. The simulation of required number of UES and DUs in a test environment that is almost close to real field deployment is not available which reduces the efficiency of the testing. Also, many existing systems require high memory and CPU capacity to perform the simulation of large number of UEs and DUs which eventually rises the cost of the deployment for testing. Thus, it is desired to at least provide a mechanism for auto focus that is devoid of the above issues.

OBJECT OF INVENTION

The principal object of the embodiments herein is to provide a new radio distributed unit (NRDU) simulation server for testing in 5G standalone (SA) communication network. Therefore, the proposed method provides a very flexible NRDU simulation server in terms of deployment and can be extended as per test requirements. Also, the NRDU simulation server consumes less resources to simulate near to filed deployment scenarios with easy configurations in terms of number of UE per cell, cells per DU, DUs per CU and such scenarios. The proposed method also provides easy and precise error detection in a large-scale setup.

SUMMARY

Accordingly, embodiments herein disclose a new radio distributed unit (NRDU) simulation server for testing in 5G standalone (SA) communication network. The NRDU simulation server includes a memory, a processor and a communicator. The processor includes a test controller connected to the plurality of simulated UEs configured to receive at least one testing profile associated with a device under test (DUT) and a multi user equipment (UE) simulator (MUCE) configured to dynamically generate a plurality of simulated UEs based on the at least one testing profile. The processor also includes a DU simulator configured to generate a plurality of simulated DUs based on the at least one testing profile; an IP security Manager (IPSEC MGR) configured to simulate internet protocol (IPSEC) functionality between at least one DU and the DUT; and a first traffic generator and a second traffic generator configured to generate a traffic profile based on the at least one testing profile.

In an embodiment, the DU simulator comprises a Control Plane Simulator (CP-SIM) configured to simulate control plane functionality between at least one DU and the DUT based on the at least one testing profile and a User Plane Simulator (UPSIM) configured to simulate user plane functionality between at least one DU and the DUT based on the at least one testing profile.

In an embodiment, the processor is configured to determine at least one of a UE load meets a UE load threshold and a DU load meets a DU load threshold, wherein the UE load is determined based on a number of UEs to be simulated and the DU load is based on a number of DUs to be simulated; and deploy at least one of the plurality of simulated UEs and the plurality of simulated DUs in another NRDU simulation server.

In an embodiment, the processor is configured to determine an error in at least one DU of the plurality of DUs connected to the DUT during the testing of the DUT. The processor is also configured to continue the test of the DUT using remaining DUs of the plurality of DUs after excluding erroneous DU; and displaying a message on the test controller indicating the erroneous DU.

In an embodiment, first traffic generator is a downlink (DL) traffic generator which is a source of DL traffic and an end point of UL traffic and wherein the second traffic generator is an uplink (UL) traffic generator which is a source of UL traffic and an end point of DL traffic.

Accordingly, embodiments herein disclose a method for testing in 5G standalone (SA) communication network using a new radio distributed unit (NRDU) simulation server. The method includes receiving, by the NRDU simulation server, at least one testing profile associated with a device under test (DUT) and generating, by the NRDU simulation server, a plurality of simulated UEs and a plurality of simulated DUs based on the at least one testing profile. The method also includes generating, by the NRDU simulation server, an IP security functionality, control plane functionality and user plane functionality between at least one DU and the DUT based on the at least one testing profile: generating, by the NRDU simulation server, a traffic profile for the plurality of simulated UEs based on the at least one testing profile; and testing, by the NRDU simulation server, the DUT based on the generated traffic profile, wherein the test is at least one of function testing, a capacity testing and a coverage testing for the DUT using the plurality of UEs.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
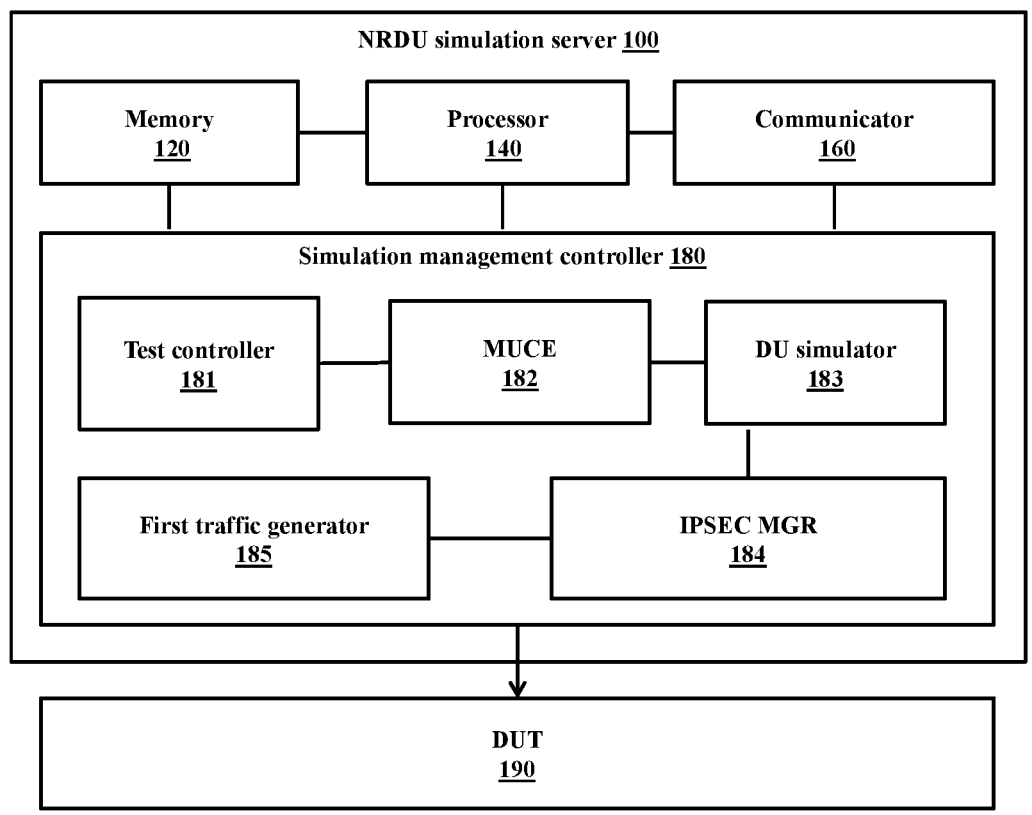
FIG. 1 illustrates a block diagram of a NRDU simulation server for testing in 5G standalone (SA) communication network, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by anolog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a new radio distributed unit (NRDU) simulation server for testing in 5G standalone (SA) communication network. The NRDU simulation server includes a memory, a processor and a communicator. The processor includes a test controller connected to the plurality of simulated UEs configured to receive at least one testing profile associated with a device under test (DUT) and a multi user equipment (UE) simulator (MUCE) configured to dynamically generate a plurality of simulated UEs based on the at least one testing profile. The processor also includes a DU simulator configured to generate a plurality of simulated DUs based on the at least one testing profile; an IP security Manager (IPSEC MGR) configured to simulate internet protocol (IPSEC) functionality between at least one DU and the DUT; and a first traffic generator and a second traffic generator configured to generate a traffic profile based on the at least one testing profile.

Accordingly, embodiments herein disclose a method for testing in 5G standalone (SA) communication network using a new radio distributed unit (NRDU) simulation server. The method includes receiving, by the NRDU simulation server, at least one testing profile associated with a device under test (DUT) and generating, by the NRDU simulation server, a plurality of simulated UEs and a plurality of simulated DUs based on the at least one testing profile. The method also includes generating, by the NRDU simulation server, an IP security functionality, control plane functionality and user plane functionality between at least one DU and the DUT based on the at least one testing profile: generating, by the NRDU simulation server, a traffic profile for the plurality of simulated UEs based on the at least one testing profile; and testing, by the NRDU simulation server, the DUT based on the generated traffic profile, wherein the test is at least one of function testing, a capacity testing and a coverage testing for the DUT using the plurality of UEs.

Conventional methods and systems for include a monolithic design which has a single data path and single control path or combined CP or UP. As a result, the memory requirement is higher in the conventional method. Therefore, specific CPU and memory is required a there is no split usage.

Unlike to the conventional methods and systems, the proposed method provides split control path and data path which are separate. Therefore, the memory requirement is low compared to the conventional systems.

Unlike to the conventional methods and systems, the proposed method is very dynamic which provides the user the option to deploy the simulator based on specific scenario and requirement. Such as for example, for UE load testing the number of UEs required to be deployed may be very high, the same can be accommodated in the proposed method. Similarly, for functional testing the number of UEs to be deployed may be few, the same can also be accommodated by the same simulator. Therefore, the proposed method is dynamic, flexible and provides high granularity.

Referring now to the drawings, and more particularly to FIGS. 1 through 4, where similar reference characters denote corresponding features consistently throughout the figures, there are shown preferred embodiments.

FIG. 1 illustrates a block diagram of a NRDU simulation server (100) for testing in 5G standalone (SA) communication network, according to an embodiment as disclosed herein.

The NRDU simulation server (100) includes a memory (120), a processor (140), a communicator (160) and a simulation management controller (180). The simulation management controller (180) includes a test controller (181), a multi-UE simulator (MUCE) (182), a DU simulator (183), an internet protocol security manager (IPSEC MGR) (184) and a first traffic generator (185). The simulation management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The FIG. 1 indicates the simulation management controller (180) out of the processor (140). However, the simulation management controller (180) can be incorporated within the processor (140) or as part of any other processor/processors or can in itself be a processor.

The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160) and the simulation management controller (180). The processor (140) is configured to execute instructions stored in the memory (120) and to perform various processes. The processor may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the NRDU simulation server (100) and with external devices via one or more networks.

In an embodiment, the test controller (182) is configured to receive at least one testing profile associated with a device under test (DUT) (190). The test controller (181) is for example a Test automation controller (TAC). The at least one testing profile includes at least one of: a number of UEs to be simulated, a traffic profile for each simulated UE, a number of DUs to be simulated, number of cells, number of sectors within each of the cells, routes for connecting each of the cells and channel conditions to be simulated. The traffic profile for each simulated UE includes at least one of a speed at which the simulated UE travels through the network and a traffic pattern mixture of data and voice calls.

The test controller (182) is configured to test the DUT (190) based on the received at least one testing profile by sending test sequences or signalling messages, etc. The test can be at least one of function testing, a capacity testing and a coverage testing for the DUT (190) using the plurality of UEs.

The test controller (182) is also configured to deploy a signalling channel and a data channel separately between the at least one DU and the DUT (190) based on the at least one testing profile. Therefore, the signalling channel cannot be used for transmission and the data channel cannot be used for signalling. The signalling channel and the data channel are exclusive and dedicated channels.

In another embodiment, the test controller (182) is configured to determine an error in at least one DU of the plurality of DUs connected to the DUT (190) during the testing of the DUT (190). In response to determining that one of the DU is erroneous, the test controller (182) is configured to continue the test of the DUT (190) using remaining DUs of the plurality of DUs after excluding erroneous DU and displaying a message on the test controller (182) indicating the erroneous DU. Here, logs associated with each of the DU are granular and available for the complete CP. Hence the detection of error is simpler and faster compared to existing methods. In the existing methods if there is an error in any of the DUs then the user will have to check for log files of each of the DUs which is cumbersome process. Therefore, the erroneous DU is easily identified and excluded from further usage.

In an embodiment, the MUCE (182) is configured to dynamically generate a plurality of simulated UEs based on the at least one testing profile. A number of the plurality of simulated UEs is determined based on user preference provided in the testing profile input by the user. The number of the plurality of simulated UEs can be varied based on the scenario to be tested. For example, for UE load testing the number of UEs to be simulated may be very large say 64 k UEs. However, for functional testing the number of the plurality of simulated UEs is comparatively lower say 256 UEs. Therefore, in the proposed method the the MUCE (182) can simulate any number of UEs depending on the user requirement and there is no limit on the number of UEs that can be simulated.

In an embodiment, the DU simulator (183) is configured to generate a plurality of simulated DUs based on the at least one testing profile and hence the number of simulated DUs is customized based on the user preference. The DU simulator (183) includes multiple Control Plane Simulators (CPSIM) and a User Plane Simulator (UPSIM). The CPSIM is configured to simulate control plane functionality between at least one DU and the DUT (190) based on the at least one testing profile. Here, the plurality of DUs are deployed as for example the CP SIMs. Each CP SIM is deployed as a single DU. The number of simulated DUs can be increased with addition of every CP SIM. The MUCE (182) and the DU simulator (183) can be deployed as part of a single server.

In another embodiment, the test controller (182) is configured to determine at least one of a UE load meets a UE load threshold and a DU load meets a DU load threshold. Here, the UE load is determined based on a number of UEs to be simulated and the DU load is based on a number of DUs to be simulated. On determining that the UE load threshold and the DU load threshold are met, the test controller (182) is configured to deploy at least one of the plurality of simulated UEs and the plurality of simulated DUs in another NRDU simulation server (100*b*).

Further, multiple CP SIMs can be clubbed together and deployed as a single application which reduces the memory usage and processing capacity of the NRDU simulation server (100). The UPSIM is configured to simulate user plane functionality between at least one DU and the DUT based on the at least one testing profile. Further, the DU simulator (183) also includes a second TTG (183*c*) which is an uplink (UL) traffic generator which is a source of UL traffic and an end point of DL traffic. In an embodiment, the first traffic generator (185) is configured to first traffic generator is a downlink (DL) traffic generator which is a source of DL traffic and an end point of UL traffic. Therefore, the proposed system is a closed loop system.

In an embodiment, the IPSEC MGR (184) is configured to simulate internet protocol (IPSEC) functionality between at least one DU and the DUT (190). The IPSEC MGR (184) simulates the IPSEC functionality by encrypting at least one of a UP payload and a CP payload that needs to be sent to the DUT (190). CHARON is a IPSEC entity used to create the IPSEC enabled payload.

Further, the NRDU simulation server (100) can simulate small-cell and macro DUs (SUB-6 & MM-WAVE), TTD and FDD. The NRDU simulation server (100) can be deployed along with LTE and ENDC to simulate 4G-5G network which is very close to field deployment. The NRDU simulation server (100) can trigger different scenarios per simulated DUs. So large combination of test scenarios can be covered. The NRDU simulation server (100) can be used in functional and capacity (most preferable) testing.

At least one of the plurality of modules/components of the test controller (181) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In an embodiment, the DUT (190) is the device which is tested under various scenarios. The DUT (190) can be for example but not limited to a next generation central unit (NGCU), gNodeB, 5G core, etc. Further, the MUCE (182) and the DU simulator (183) can be used for testing either both or one of the NGCU and the 5GC.

Although the FIG. 1 shows various hardware components of the NRDU simulation server (100) but it is to be understood that other embodiments are not limited thereon. In other embodiments, the NRDU simulation server (100) may include less or more number of components. Further, the labels or names of the components are used only for illustrative purpose and does not limit the scope of the invention. One or more components can be combined together to perform same or substantially similar function to manage the contact pressure in the NRDU simulation server (100).

Figure 2A:
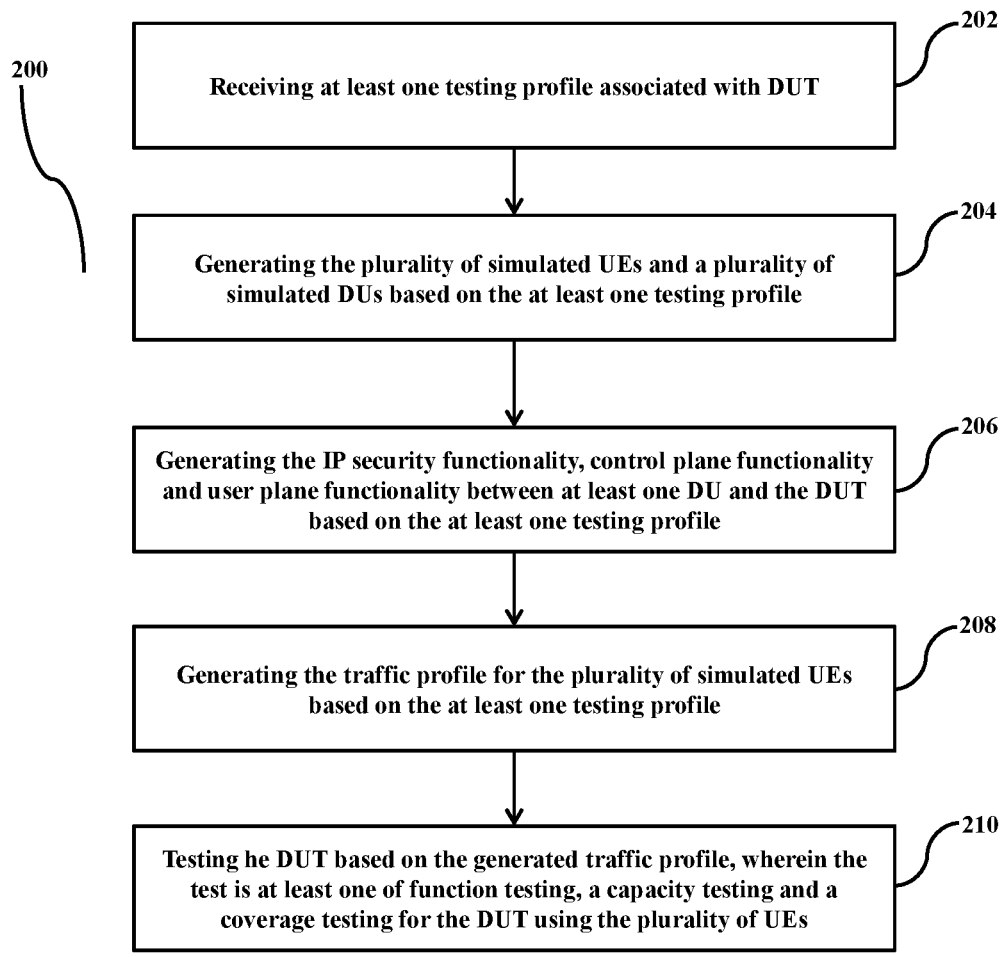
FIG. 2A is a flow diagram illustrating a method for testing in the 5G SA communication network using the NRDU simulation server, according to an embodiment as disclosed herein.

FIG. 2A is a flow diagram (200) illustrating a method for testing in the 5G SA communication network using the NRDU simulation server (100), according to an embodiment as disclosed herein.

Referring to the FIG. 2A, at step 202, the method includes the NRDU simulation server (100) receiving the at least one testing profile associated with DUT (190). For example, in the NRDU simulation server (100) described in the FIG. 1, the simulation management controller (180) is configured to receive the at least one testing profile associated with DUT (190).

At step 204, the method includes the NRDU simulation server (100) generating the plurality of simulated UEs and the plurality of simulated DUs based on the at least one testing profile. For example, in the NRDU simulation server (100) described in the FIG. 1, the simulation management controller (180) is configured to generate the plurality of simulated UEs and the plurality of simulated DUs based on the at least one testing profile.

At step 206, the method includes the NRDU simulation server (100) generating the IP security functionality, control plane functionality and user plane functionality between at least one DU and the DUT based on the at least one testing profile. For example, in the NRDU simulation server (100) described in the FIG. 1, the simulation management controller (180) is configured to generate the IP security functionality, control plane functionality and user plane functionality between at least one DU and the DUT (190) based on the at least one testing profile.

At step 214, the method includes the NRDU simulation server (100) generating the traffic profile for the plurality of simulated UEs based on the at least one testing profile. For example, in the NRDU simulation server (100) described in the FIG. 1, the simulation management controller (180) is configured to generate the traffic profile for the plurality of simulated UEs based on the at least one testing profile.

At step 214, the method includes the NRDU simulation server (100) testing the DUT (190) based on the generated traffic profile. For example, in the NRDU simulation server (100) described in the FIG. 1, the simulation management controller (180) is configured to test the DUT (190) based on the generated traffic profile.

The various actions, acts, blocks, steps, or the like in the flow diagram (200) may be performed in the order presented, in a different order or simultaneously. Further, in some embodiments, some of the actions, acts, blocks, steps, or the like may be omitted, added, modified, skipped, or the like without departing from the scope of the invention.

Figure 2B:
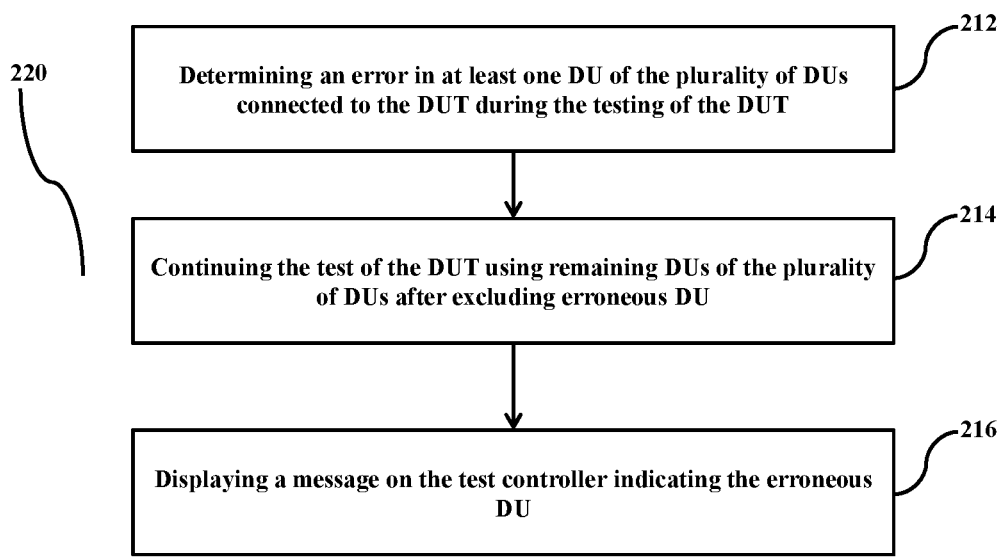
FIG. 2B is a flow diagram illustrating a method for continuing the testing in the 5G SA communication network using the NRDU simulation server during an error, according to an embodiment as disclosed herein.

FIG. 2B is a flow diagram (220) illustrating a method for continuing the testing in the 5G SA communication network using the NRDU simulation server (100) during the error, according to an embodiment as disclosed herein.

Referring to the FIG. 2B, at step 212, the method includes the NRDU simulation server (100) determining the error in the at least one DU of the plurality of DUs connected to the DUT (190) during the testing of the DUT (190). For example, in the NRDU simulation server (100) described in the FIG. 1, the simulation management controller (180) is configured to determine the error in the at least one DU of the plurality of DUs connected to the DUT (190) during the testing of the DUT (190).

At step 214, the method includes the NRDU simulation server (100) continuing the test of the DUT (190) using remaining DUs of the plurality of DUs after excluding erroneous DU. For example, in the NRDU simulation server (100) described in the FIG. 1, the simulation management controller (180) is configured to continue the test of the DUT (190) using remaining DUs of the plurality of DUs after excluding erroneous DU.

At step 216, the method includes the NRDU simulation server (100) displaying the message on the test controller (181) indicating the erroneous DU. For example, in the NRDU simulation server (100) described in the FIG. 1, the simulation management controller (180) is configured to display the message on the test controller (181) indicating the erroneous DU.

The various actions, acts, blocks, steps, or the like in the flow diagram (220) may be performed in the order presented, in a different order or simultaneously. Further, in some embodiments, some of the actions, acts, blocks, steps, or the like may be omitted, added, modified, skipped, or the like without departing from the scope of the invention.

Figure 3:
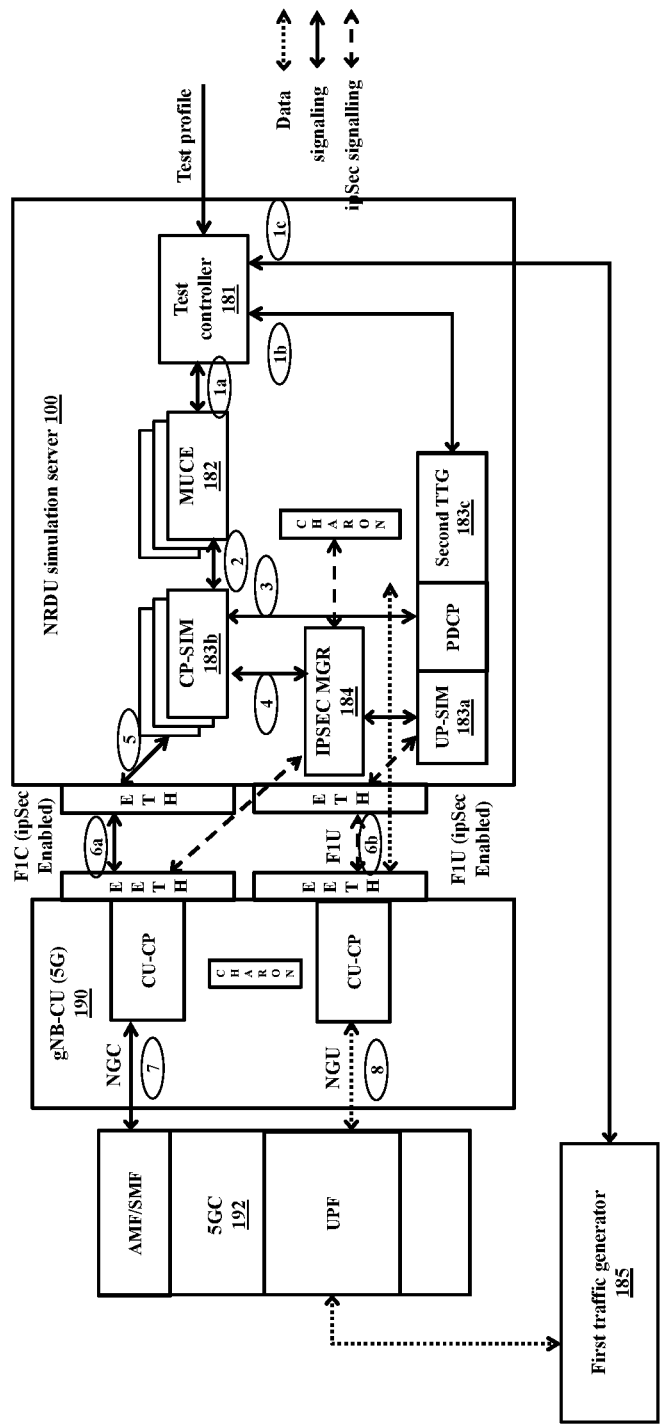
FIG. 3 is an example deployment of the NRDU simulation server to test a NGCU, according to an embodiment as disclosed herein.

FIG. 3 is an example deployment of the NRDU simulation server (100) to test the NGCU (190), according to an embodiment as disclosed herein.

Referring to the FIG. 3, the example deployment of the NRDU simulation server (100) to test the DUT which is the NGCU (190) in the scenario is provided. Here, the NGCU (190) needs to be tested and hence all other entities need to be simulated.

The test controller (181) is the heart of the NRDU simulation server (100) and controls the entire server. The test controller (181) receives the test profile from the user as the input. Further, at step 1a, the test controller (181) simulates the entire DU-SIM. DU-SIM simulation includes the simulation of the multiple UEs, multiple DUs, and both the first traffic generator (185) and the second TTG (183c) (step 1b and step 1c). The first traffic generator (185) and the second TTG (183c) are deployed in the distributed fashion. Further, the first traffic generator (185) and the second TTG (183c) may include schedulers to vary traffic such as burst traffic, one-by-one traffic, etc can be generated based on the test profile provided by the user. Based on the test profile the internal payload will be simulated with the required traffic profile. Therefore, the proposed method allows the user to emulate the entire real-time environment such that the NGCU (190) will believe that the payload is arriving from the real-environment.

The proposed design is very flexible such that even with a single core and minimum number of RAM the NRDU simulation server (100) will be able to simulate as many UEs as possible.

The signalling in step 5, step 6a-6b are all specification driven i.e., FIC message, FIU message, NAS messages or RRC messages, etc. which are also generated by the NRDU simulation server (100) to replicate the real-time field environment. These can be generated based on the test profile. For example, consider that the test profile is for registration of the UEs or initiating the PDU session, then the signalling will be corresponding messages required to achieve the specific scenario mentioned in the test profile.

Further, the FIC message or the FIU message may be encrypted using the IPSEC MGR (184). Therefore, the proposed method allows the user to create IP Sec encrypted payloads in both CP and UP as it is done during filed deployment. The data traffic is the actual traffic that is being transmitted throughout the NRDU simulation server (100). At step 7, the CU-CP from the NGCU (190) sends the signalling messages to the AMF/SMF of the 5GC (192). Therefore, the proposed method establishes separate channels for the signalling and data traffic which is exactly same as the field deployment. The ipsec messages pass through the same interface but the communication is between CHARON in the NRDU simulation server (100) and the CHARON in the NGCU (190).

Horizontal scaling can be performed in the design to include multiple CP-SIM due to the split architecture which includes separate data path and signal path with the UEs separated from the DUs. For example, when more UE load is required the MUCE (182) can be deployed in a separate server out of the NRDU simulation server (100). Similarly, when more control path load is required the CP-SIM can be deployed in a separate server out of the NRDU simulation server (100) or when more data path load is required the UP-SIM can be deployed in a separate server out of the NRDU simulation server (100). Therefore, the proposed design provides very high flexibility and granularity in simulating the NRDU simulation server (100). The NRDU simulation server (100) can be deployed as a single Virtual Machine (VM) or as multiple VMs based on the requirement.

Further, the proposed design allows the user to deploy multiple NRDU simulation server (100)s to generate more load by replicating the functionality of one of the NRDU simulation server (100) to achieve vertical scaling of the NRDU simulation server (100). In an example, consider that a worker node load capability of the NGCU (190) needs to be tested. When 10 NRDU simulation server (100) are loaded to the NGCU (190) the worker node load capability is tested. Therefore, the 10 instances of the NRDU simulation server (100) are created in the proposed method.

Also, the proposed method allows the downgrading and upgrading of the memory usage depending on the requirement of the test profile to be generate.

The NRDU simulation server (100) also supports containerized deployment. However, the choice of whether an operator will choose to deploy the NRDU simulation server (100) in the containers or in the VMs depends on the environment needed and various factors. The various factors considered can be for example but not limited to: CPU utilization, use of different operating systems, start-up time development cycle of the NRDU simulation server (100), etc. Such as for example, CPU utilization is very high in the VMs due to the number of Oss being used. Multiple containers use one common server OS, which reduces the CPU utilization in a containerized environment.

Figure 4:
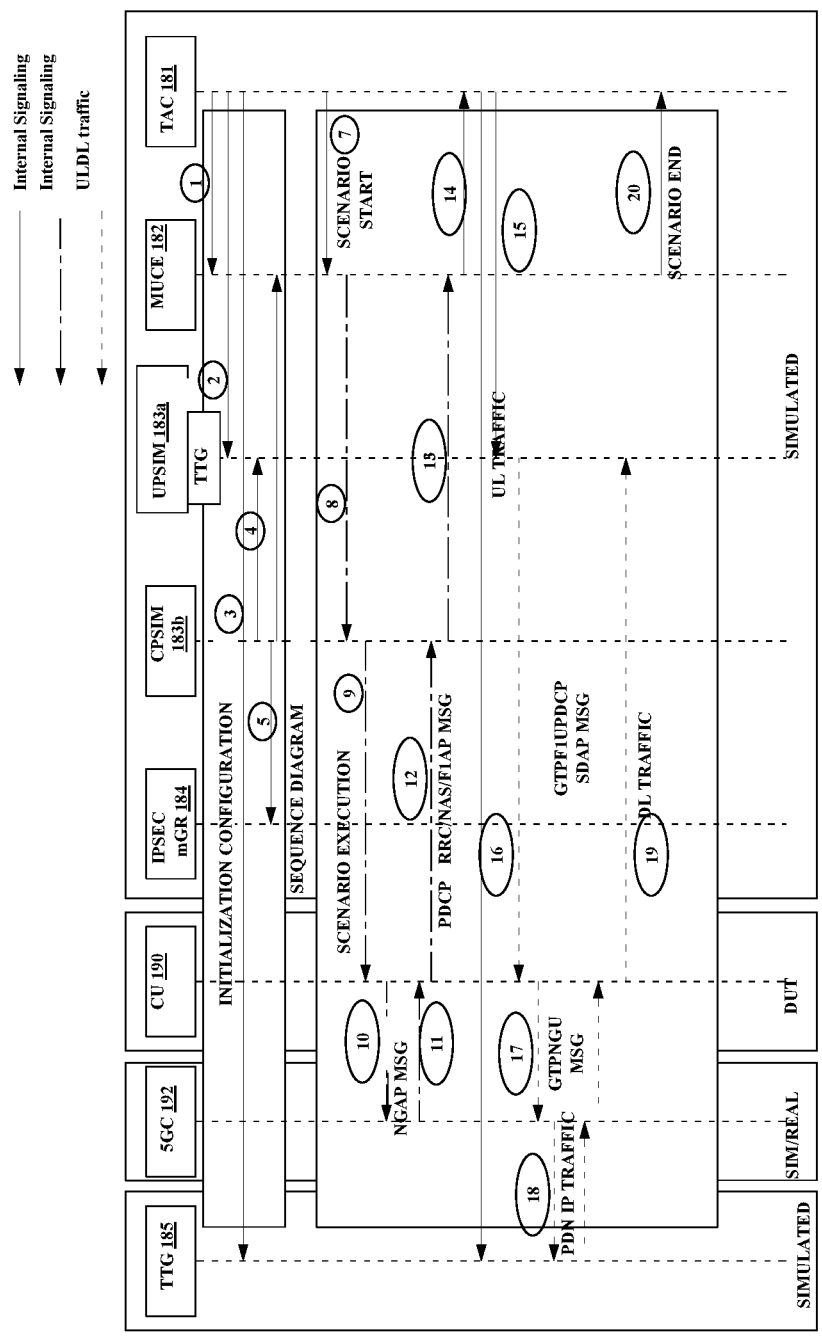
FIG. 4 is a signalling diagram illustrating various message flow between the various components of the NRDU simulation server, according to an embodiment as disclosed herein.

FIG. 4 is a signalling diagram illustrating various message flow between the various components of the NRDU simulation server (100), according to an embodiment as disclosed herein.

Referring to the FIG. 4, first part of the signalling includes configuration and initialization of the simulation by the NRDU simulation server (100). At step 1, the test controller (181) receives the test profile from the user regarding the simulation to be initiated and then sends the indication to the MUCE (182) to simulate multiple UEs based on the received test profile from the user. At step 2 and step 3, the test controller (181) instructs the second TTG (183c) and the first TTG (185) respectively to generate the UL traffic and the DL traffic respectively as per user requirement.

Further, at step 4 and step 5, the CPSIM (183b) coordinates with the UPSIM (183a) and the IPSEC mGR (184) with the MUCE (182) with various signalling. Therefore, the required environment for testing is achieved. Once the required environment is achieved, the testing begins. Here, the environment created is close to real-time environment which makes the testing highly efficient and reduces the possible errors in testing.

At step 7, the test controller (181) sends the instructions to the MUCE (182) and at step 8, the MUCE (182) coordinates with the CPSIM (183b) which is nothing but the simulated DU to execute the test scenario on the DUT (190). Here, the DUT (190) is the CU. At step 10 and 11, the NGAP messages are exchanged between the CU (190) and the 5GC (192). At step 13, the CU (190) responds the test scenario by sending one of PDCP, RRC, NAS, FIAP signalling messages to the CPSIM (183b). The CPSIM (183b) then indicates the test scenario results to the test controller (181) (step 14).

At step 15, the test controller (181) initiates the UL traffic scenario by sending an initiation request to the second TTG (183c) of the UPSIM (183a). The UL traffic is generated as per the instruction received from the test controller (181) and sent to the CU (190) for testing the CU (190) with respect to the UL traffic scenario.

At step 17, the CU (190) interacts with the 5GC (192) by sending the GTPNGU message. Further, the first TTG (185) is the end point for the UL traffic i.e., the PDN IP traffic, as indicated by step 18. Further, in response the DL traffic is generated by the first TTG (185) and the same is tested at the CU (190) and the DL traffic related response is sent to the second TTG (183c) which is the end point for the DL traffic, as shown in step 19. Therefore, the proposed system provides a closed environment where the traffic generated and ends within the system leading to a real-time environment like scenario. At step 20, the test controller (181) displays the test result to the user.

Therefore, the proposed method includes the following advantages:
1. A unified environment is generated for deploying the NR nodes in a simulated framework
2. Smaller resource footprint when compared to existing simulators with lesser capacity VMs.
3. Flexibility of choosing VM resources based on scenario (i.e., lesser number of CPU cores and Memory per VM in case of smaller deployment scenario)
4. Reduces cost of deployment of tools for capacity and performance testing.
5. Ability to test signaling KPIs and multi Gbps of data traffic in the simulation mode
6. In built traffic generator that can simulate both UDP and TCP traffic
7. Can be deployed with real UEs and DUs in a test setup. Real and simulated can work in parallel.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A new radio distributed unit (NRDU) simulation server for testing in 5G standalone (SA) communication network, wherein the NRDU simulation server comprises:
   a memory;
   a processor coupled to the memory;
   a communicator coupled to the memory and the processor;
   wherein the processor comprises:
      a test controller connected to the plurality of simulated UEs configured to receive at least one testing profile associated with a device under test (DUT);
      a multi user equipment (UE) simulator (MUCE) configured to dynamically generate a plurality of simulated UEs based on the at least one testing profile;
      a DU simulator configured to generate a plurality of simulated DUs based on the at least one testing profile;
      an IP security Manager (IPSEC MGR) configured to simulate internet protocol (IPSEC) functionality between at least one DU and the DUT; and
      a first traffic generator and a second traffic generator configured to generate a traffic profile based on the at least one testing profile.

2. The NRDU simulation server as claimed in claim 1, further comprises a signaling channel and a data channel deployed separately between the at least one DU and the DUT based on the at least one testing profile.

3. The NRDU simulation server as claimed in claim 1, wherein the DU simulator comprises a Control Plane Simulator (CPSIM) configured to simulate control plane functionality between at least one DU and the DUT based on the at least one testing profile and a User Plane Simulator (UPSIM) configured to simulate user plane functionality between at least one DU and the DUT based on the at least one testing profile.

4. The NRDU handover simulator as claimed in claim 3, wherein the processor is further configured to:

determine an error in at least one DU of the plurality of DUs connected to the DUT during the testing of the DUT;

continue the test of the DUT using remaining DUs of the plurality of DUs after excluding erroneous DU; and displaying a message on the test controller indicating the erroneous DU.

5. The NRDU simulation server as claimed in claim 1, wherein the processor is further configured to:

determine at least one of a UE load meets a UE load threshold and a DU load meets a DU load threshold, wherein the UE load is determined based on a number of UEs to be simulated and the DU load is based on a number of DUs to be simulated; and deploy at least one of the plurality of simulated UEs and the plurality of simulated DUs in another NRDU simulation server.

6. The NRDU handover simulator as claimed in claim 1, wherein the processor is configured to:

test the DUT based on the received at least one testing profile, wherein the test is at least one of function testing, a capacity testing and a coverage testing for the DUT using the plurality of UEs.

7. The NRDU simulation server as claimed in claim 1, wherein the first traffic generator is a downlink (DL) traffic generator which is a source of DL traffic and an end point of UL traffic and wherein the second traffic generator is an uplink (UL) traffic generator which is a source of UL traffic and an end point of DL traffic.

8. The NRDU simulation server as claimed in claim 1, wherein the UPSIM comprises the second traffic generator and Packet Data Convergence Protocol (PDPC) manager.

9. The NRDU simulation server as claimed in claim 1, wherein the IPSEC MGR simulates the IPSEC functionality by encrypting at least one of a UP payload and a CP payload.

10. The NRDU handover simulator as claimed in claim 1, wherein the at least one testing profile comprises at least one of: a number of UEs to be simulated, a traffic profile for each simulated UE, a number of DUs to be simulated, number of cells, number of sectors within each of the cells, routes for connecting each of the cells and channel conditions to be simulated and wherein the traffic profile for each simulated UE comprises at least one of a speed at which the simulated UE travels through the network and a traffic pattern mixture of data and voice calls.

11. The method as claimed in claim 10, further comprises deploying a signaling channel and a data channel between the at least one DU and the DUT based on the at least one testing profile.

12. The method as claimed in claim 10, further comprises:

determining, by the NRDU simulation server, at least one of a UE load meets a UE load threshold and a DU load meets a DU load threshold, wherein the UE load is determined based on a number of UEs to be simulated and the DU load is based on a number of DUs to be simulated; and deploying, by the NRDU simulation server, at least one of the plurality of simulated UEs and the plurality of simulated DUs in another NRDU simulation server.

13. The method as claimed in claim 10, wherein the processor is further configured to:

determining, by the NRDU simulation server, an error in at least one DU of the plurality of DUs connected to the DUT during the testing of the DUT;

continuing, by the NRDU simulation server, the test of the DUT using remaining DUs of the plurality of DUs after excluding erroneous DU; and displaying, by the NRDU simulation server, a message on the test controller indicating the erroneous DU.

14. The method as claimed in claim 10, wherein the NRDU simulation server comprises a first traffic generator is a downlink (DL) traffic generator which is a source of DL traffic and an end point of UL traffic and wherein a second traffic generator is an uplink (UL) traffic generator which is a source of UL traffic and an end point of DL traffic.

15. The method as claimed in claim 10, wherein the NRDU simulation server comprises a UPSIM and wherein the UPSIM comprises the second traffic generator and Packet Data Convergence Protocol (PDPC) manager.

16. The method as claimed in claim 10, wherein the IPSEC functionality is simulated by encrypting at least one of a UP payload and a CP payload.

17. The method as claimed in claim 10, wherein the at least one testing profile comprises at least one of: a number of UEs to be simulated, a traffic profile for each simulated UE, a number of DUs to be simulated, number of cells, number of sectors within each of the cells, routes for connecting each of the cells and channel conditions to be simulated and wherein the traffic profile for each simulated UE comprises at least one of a speed at which the simulated UE travels through the network and a traffic pattern mixture of data and voice calls.

18. A method for testing in 5G standalone (SA) communication network using a new radio distributed unit (NRDU) simulation server, wherein the method comprises:

receiving, by the NRDU simulation server, at least one testing profile associated with a device under test (DUT);

generating, by the NRDU simulation server, a plurality of simulated UEs and a plurality of simulated DUs based on the at least one testing profile;

generating, by the NRDU simulation server, an IP security functionality, control plane functionality and user plane functionality between at least one DU and the DUT based on the at least one testing profile;

generating, by the NRDU simulation server, a traffic profile for the plurality of simulated UEs based on the at least one testing profile; and testing, by the NRDU simulation server, the DUT based on the generated traffic profile, wherein the test is at least one of function testing, a capacity testing and a coverage testing for the DUT using the plurality of UEs.

* * * * *